United States Patent [19]
Hentschel et al.

[11] 4,292,187
[45] Sep. 29, 1981

[54] LUBRICATING OILS FOR THE WORKING OF METALS

[75] Inventors: Karl-Heinz Hentschel; Rolf Dhein, both of Krefeld; Wolfgang Schüle, Ketsch, all of Fed. Rep. of Germany

[73] Assignee: Bayer Aktiengesellschaft, Fed. Rep. of Germany

[21] Appl. No.: 127,741

[22] Filed: Mar. 6, 1980

[30] Foreign Application Priority Data

Mar. 10, 1979 [DE] Fed. Rep. of Germany ....... 2909517

[51] Int. Cl.$^3$ ........................ C10M 1/24; C10M 1/06; C09F 5/08; C07C 69/66

[52] U.S. Cl. ................................ 252/49.5; 252/56 S; 260/410.6; 560/126; 560/128; 560/183; 560/179

[58] Field of Search ............................ 252/56 S, 49.5; 260/410.6; 560/126, 128, 183, 179

[56] References Cited

U.S. PATENT DOCUMENTS 4,031,019 6/1977 Bell .................................. 252/56 S
4,191,658 3/1980 Jahnke .......................... 252/56 S X

*Primary Examiner*—Paul F. Shaver
*Attorney, Agent, or Firm*—Connolly and Hutz

[57] ABSTRACT

A condensation product from aliphatic or cycloaliphatic polyols, aliphatic saturated or once unsaturated hydroxycarboxylic acids and aliphatic or cycloaliphatic saturated or unsaturated monocarboxylic acids is an effective lubricant for the working of metals, optionally in admixture with other lubricating oils and conventional additives.

7 Claims, No Drawings

LUBRICATING OILS FOR THE WORKING OF METALS

This invention relates to new basic lubricants for the working and shaping of metals, preferably for swarf-free shaping such as, for example, for cold or hot rolling of steel or aluminium products.

The requirements made of lubricants for the processing of metals have been increased considerably in recent times. This is the case, for example, in the cold or hot shaping of steel, where relatively large steel plates, the introduction of high speed band rolling mills and continuous casting methods have given rise to the danger of the frequent occurrence of surface defects in the finished products, as well as a reduction in the service life of the working roll and counter roll used for rolling the steel. In the cold or hot processing of ferrous or non-ferrous metals, the hydrogen produced by the reaction of the metal with the water present in the cooling lubricant as an external phase can lead to "hydrogen embrittlement" of the roll steel, making the surfaces of the working rolls and counter rolls more and more brittle.

Oil-in-water emulsions, so-called cooling lubricants, based on spermaceti oil (sperm whale oil), mixtures of sperm oil and mineral oil, or mixtures of sperm oil with other vegetable or animal oils could be used quite successfully in the past as lubricants in the working of metals, despite the above-mentioned increased requirements. More recently, however, whaling is being increasingly restricted owing to international protective measures so that there is less and less sperm oil available.

Attempts to switch over to other natural oils of vegetable or animal origin have been unsatisfactory. Rape seed oils, for example, age too quickly at the high temperatures prevailing in the modern high speed band rolling mills and become resinous and soon become unusable. Although palm kernel oils are more resistant to thermo-oxidative ageing, they do not contain sufficient ethylenically unsaturated aliphatic groups to effectively counteract hydrogen embrittlement of the roll steel at high band speeds (about 1000 M/min). Other inexpensive natural vegetable oils such as soya oil, cotton seed oil, ground nut oil or linseed oil do not meet the high requirements with regard to thermo-oxidative resistance owing to their high content of multiply unsaturated fatty acids.

Attempts have therefore already been made to use synthetic fatty acid esters. German Auslegeschrift No. 1,794,240, for example, discloses esters of synthetic polyols having from 2 to 12 hydroxyl groups and $C_{12}$–$C_{22}$-fatty acids. However, these esters also have different properties from sperm oil and do not meet all the requirements for the working of metals.

There is, therefore, a need for new inexpensive lubricants which can also be used in emulsion as cooling lubricants, have excellent stability to ageing, a good lubricating effect and similar properties to sperm oil, counteract hydrogen embrittlement of roll steel and can advantageously be used in a similar manner to sperm oil in the working and shaping of metals.

It has accordingly been found that these requirements are met by unsaturated condensation products (esters) of (cyclo)aliphatic polyols with aliphatic hydroxycarboxylic acids, lactones or oligomers and (cyclo)aliphatic monocarboxylic acids thereof.

The invention provides unsaturated condensation products derived from (A) from 5 to 25% by weight of at least one aliphatic or cycloaliphatic polyol containing from 2 to 60 carbon atoms and from 2 to 8 alcoholic hydroxyl groups per molecule, (B) from 5 to 40% by weight of at least one aliphatic saturated or once unsaturated $C_6$–$C_{22}$-hydroxycarboxylic acid or its lactone and/or its oligomeric condensation products with an average degree of oligomerisation of from 2 to 50 and an average molecular weight of from 210 to 12,000, and (C) from 35 to 90% by weight of at least one saturated or unsaturated, straight-chained or slightly branched, aliphatic or cycloaliphatic $C_6$–$C_{24}$-monocarboxylic acid, wherein the sum of the components (A) to (C) is 100% by weight and the condensation products have 1. an acid number of from 0.01 to 30 mg KOH/g,
2. a hydroxyl number of from 0.01 to 60 mg KOH/g, and
3. an iodine number of from 30 to 100.

The iodine number is determined in a known manner by the Hanus or Wijs method.

Preferred condensation products are those produced from (A) from 8 to 18% by weight of polyol, (B) from 15 to 35% by weight of hydroxycarboxylic acid and/or the oligomerisation products thereof, and (C) from 47 to 77% by weight of monocarboxylic acid.

If the acid number of the polycondensates is higher than 30 mg KOH/g, the surface of the metal cannot be "greased" sufficiently. In addition, such products cause greater wear of the metal working tools.

The "greasing" of the metals is also unsatisfactory with polycondensates having hydroxyl numbers higher than 60. Moreover, such high contents of alcoholic hydroxyl groups can accelerate the ageing of the oil.

Oils having iodine numbers below 30 do not protect the metal working tool steels sufficiently from hydrogen embrittlement while, on the other hand, oils having iodine numbers above 100 age too quickly under thermo-oxidative conditions and become resinous.

The polyol components of the oils according to the invention are preferably those containing from 2 to 6 alcoholic hydroxyl groups and are preferably composed of from 2 to 20 carbon atoms. Aliphatic and cycloaliphatic polyalcohols are particularly preferred. Examples include: ethylene glycol, 1,2- and 1,3-propylene glycol, 1,2-, 1,3- and 1,4-butanediol, pentanediols, neopentylglycol, hexanediols, trimethylhexanediols, decanediols, dodecanediols, 2,2-dimethyl-1,3-propanediol-2,2-dimethyl-3-hydroxypropionate, diethyleneglycol, triethylene-glycol, tetraethyleneglycol, dipropyleneglycol, tripropyleneglycol, tetrapropyleneglycol, 1,4-cyclohexanedimethanol, 1,1-cyclohexane-dimethanol, perhydrobisphenols, glycerine, 1,2,4-butanetriol, trimethylolethane, trimethylol propane, trimethylol butane, pentaerythritol, tetroses, bis and tris-trimetholylpropane, pentoses, 2,2,6,6-tetrakis-(hydroxymethyl)-cyclohexanol, hexoses, dipentaerythritol, tripentaerythritol and ethylene oxide or propylene oxide adducts to these polyols, providing they do not have more than an average number of 60 carbon atoms per molecule.

Hydroxycarboxylic acids in the context of the invention include, for example, $\epsilon$-hydroxycaproic acids or their lactones, 12-hydroxylauric acid and hydroxystearic acids, but ricinoleic acid is particularly preferred.

Oligomeric condensation products of the hydroxycarboxylic acids include oligo-hydroxycarboxylic acids, such as oligocaprolactones and oligoricinoleic acids, the production of which is known to the skilled man, or adducts of ε-caprolactone to monomeric or oligomeric ricinoleic acids. The degree of oligomerisation thereof is preferably from 2 to 20 and the average molecular weight from 210 to 5,000.

Synthetic or natural fatty acids containing up to 3 olefinic double bonds per molecule can be used as monocarboxylic acids. It is necessary, however, to select the fatty acids in such a way that not more than 2% by weight of 3-fold unsaturated and not more than 20% by weight of 2-fold unsaturated fatty acids are contained, based on the total weight of the hydroxycarboxylic acids and fatty acids used. Examples include: caproic acid, caprylic acid, 2-ethylhexanoic acid, cyclohexyl carboxylic acid, isononanic acid, capric acid, lauric acid, myristic acid, palmitic acid, stearic acid, eicosanic acid, 10-undecenic acid, palmitoleic acid, oleic acid, fatty acid mixtures such as tallow, rape, lard, ground nut, cotton seed, coconut, palm kernel, palm or soya oil fatty acids and isostearic acid.

The polycondensates according to the invention are produced by a combination of the processes known from the literature for the oligomerisation of hydroxycarboxylic acids and for the production of fatty acids or polyhydric alcohols.

The lubricants according to the invention can be used alone or in a mixture with mineral oils, ester oils, polyether oils, poly-α-olefins or phosphate oils, optionally with the addition of conventional additives such as antioxidants, anti-abrasion and corrosion protection additives, high pressure additives, emulsifiers, anti-foam additives or anti-microbial substances, in liquid form or in the form of an oil-in-water emulsion, during the working and shaping of metals, preferably during the non-cutting shaping of metals such as, for example, steel, aluminium, magnesium, copper, brass and titanium.

The polycondensates in the context of the invention are distinguished by their excellent stability to ageing and their "greasing" of the metals, i.e. good adhesion of the lubricating film to the metal surfaces, as well as by their good viscosity-temperature properties.

If mixtures of the condensation products according to the invention with other lubricants, for example mineral oils, are used, these mixtures should also have iodine numbers of from 30 to 100. Therefore, for mixing purposes, even those condensation products optionally having higher iodine numbers can be used.

The following Examples illustrate the invention.

EXAMPLE 1

462.8 g of castor oil and 372.5 g of ricinoleic acid were firstly heated to 140° C. in 1 hour with stirring and passage of nitrogen gas thereover to produce oligoricinoleic acid, then heated to 190° C. within 5 hours with removal of water. The acid number was 9.3 mg KOH/g after about 6 hours at 190° C. 335.0 g of trimethylolpropane as well as 2.75 g of titanium tetrabutylate were then added after cooling to 100° C. The mixture was then heated to 140° C. in 1 hour, then to 180° C. in 4 hours. After stirring for 6 hours at 180° C., the mixture was cooled again to 100° C. and 1370 g of tallow fatty acid as well as 360.0 g of 2-ethylhexanoic acid were added. The mixture was again heated to 190° C. and kept at this temperature with elimination of water until an acid number of 10 mg KOH/g was attained. The delivery viscosity of the end product at 20° C. was 58 sec. (4 mm Ford-beaker).

Hydroxyl number: 55 to 56;
Iodine number (according to Hanus): 58 to 61;
Kinematic viscosity (37.8° C.)=95.6 cSt ($mm^2$/sec);
Kinematic viscosity (98.9° C.)=13.2 cSt ($mm^2$/sec);
Viscosity index$_E$: 147.

EXAMPLE 2

694.2 g of castor oil were heated with 558.8 g of ricinoleic acid with stirring and passage of nitrogen to 140° C. in 1 hour and then heated to 190° C. within 5 hours with separation of water. The acid number was 9.8 mg KOH/g after stirring for about 2 hours at 190° C. After cooling the mixture to 100° C., 502.5 g of trimethylolpropane as well as 4.6 g of titanium tetrabutylate were added, and the mixture was heated to 180° C. within 1 hour and left for 6 hours at this temperature. The mixture was again cooled to 100° C., 2466.0 g of tallow fatty acids, 194.4 g of lauric acid and 363.0 g of isostearic acid were added and the mixture was heated to 140° C. within 1 hour and then to 190° C. within 6 hours. Isostearic acid is a conventional commercial mixture of slightly methyl-branched saturated $C_{18}$-fatty acids containing, for example, 16-methylheptadecanic acid. After a 10 hour reaction at 190° C., the mixture attained an acid number of 10.2 mg KOH/g. The delivery viscosity of the end product at 20° C. was 65 sec. (4 mm Ford-beaker).

Hydroxyl number: 48;
Iodine number (according to Hanus): 63 to 64;
Kinematic viscosity (37.8° C.)=115.0 cSt ($mm^2$/sec);
Kinematic viscosity (98.9° C.)=17.2 cSt ($mm^2$/sec);
Viscosity index$_E$=174.

We claim:

1. A condensation product produced from (A) from 5 to 25% by weight of at least one aliphatic or cycloaliphatic polyol containing from 2 to 60 carbon atoms and from 2 to 8 alcoholic hydroxyl groups per molecule, (B) from 5 to 40% by weight of at least one aliphatic saturated or once unsaturated $C_6$–$C_{22}$-hydroxycarboxylic acid or a lactone thereof and/or an oligomeric condensation product thereof with an average degree of oligomerisation of from 2 to 50 and an average molecular weight of from 210 to 12,000, and (C) from 35 to 90% by weight of at least one saturated or unsaturated, straight-chained or slightly branched, aliphatic or cycloaliphatic $C_6$–$C_{24}$-monocarboxylic acid, wherein the sum of the components (A) to (C) is 100% by weight and the condensation product has (1) an acid number of from 0.01 to 30 mg KOH/g,
(2) a hydroxyl number of from 0.01 to 60 mg KOH/g, and
(3) an iodine number of from 30 to 100.

2. A condensation product according to claim 1, produced from (A) from 8 to 18% by weight of the polyol,
(B) from 15 to 35% by weight of the $C_6$–$C_{22}$-hydroxycarboxylic acid and/or the oligomerisation product thereof, and
(C) from 47 to 77% by weight of the $C_6$–$C_{24}$-monocarboxylic acid.

3. A condensation product according to claim 1 or 2, wherein the polyol contains from 2 to 20 carbon atoms and from 2 to 6 alcoholic hydroxyl groups per molecule.

4. A condensation product according to any one of claims 1 to 3, wherein the hydroxycarboxylic acid is ricinoleic acid.

5. A condensation product according to any one of claims 1 to 4, wherein component (B) is an oligomerisation product of a hydroxycarboxylic acid having an average degree of oligomerisation of from 2 to 20 and an average molecular weight of from 210 to 5,000.

6. A lubricant for the working of metal, comprising a condensation product according to any one of claims 1 to 5 alone or in a mixture with at least one other lubricating oil, and optionally with at least one conventional additive.

7. A cooling lubricant for the non-cutting working of a metal comprising a condensation product or a lubricant according to any one of claims 1 to 5 in the form of an oil-in-water emulsion.

* * * * *